United States Patent [19]

Kingston et al.

[11] 4,357,610

[45] Nov. 2, 1982

[54] WAVEFORM ENCODED ALTITUDE SENSOR

[75] Inventors: Samuel C. Kingston; Virgil A. Ehresman, both of Salt Lake City, Utah

[73] Assignee: Sperry Corporation, New York, N.Y.

[21] Appl. No.: 191,872

[22] Filed: Sep. 29, 1980

[51] Int. Cl.³ ............................................ G01S 13/08
[52] U.S. Cl. ............................... 343/12 A; 343/5 NQ; 343/7 A; 343/100 CL
[58] Field of Search ............ 343/12 A, 100 CL, 5 NQ

[56] References Cited

U.S. PATENT DOCUMENTS

| | | | |
|---|---|---|---|
| 3,157,874 | 11/1964 | Altar et al. | 343/100 CL X |
| 3,774,206 | 11/1973 | Rauch | 343/12 A X |
| 4,053,888 | 10/1977 | Robin et al. | 343/100 CL |

*Primary Examiner*—T. H. Tubbesing

*Attorney, Agent, or Firm*—John B. Sowell; Kenneth T. Grace; Marshall M. Truex

[57] ABSTRACT

The present invention provides a spread spectrum waveform encoded altimeter. Spread spectrum carrier wave signals which are transmitted and later received are processed in a novel edge detecting apparatus which includes a plurality of individual detectors. A pair of detectors are provided to detect an early chip or signal. Another pair of detectors are provided to detect a late chip or signal. There is also provided a pair of edge chip detectors for detecting the center or locked on chip signal. Logic circuits are employed to sum the voltage signals from the detectors and to provide a control signal capable of adjusting a tracking generator to enable it to lock on to the received signal. An altimeter counter is provided which is started by a unique chip in the transmitted signal and stopped when the same unique chip is detected in the receiving and tracking loop.

14 Claims, 3 Drawing Figures

WAVEFORM ENCODED ALTITUDE SENSOR

BACKGROUND OF THE INVENTION

1. Field of the Invention

This invention relates to an altimeter for aircraft, and more particularly, relates to a spread spectrum waveform encoded altimeter apparatus, which has a low probability of being intercepted.

2. Description of the Prior Art

Radio frequency altimeters are known. The most common type of radio frequency altimeter transmits a burst of energy from a transmitting antenna and receives the reflected energy signal back at a receiving antenna. At the time the burst of energy is transmitted a ranging system or counter is started. When the reflected energy signal is received, the ranging system or counter is stopped. The time for making the round trip may be converted into distance or elevation by known techniques.

The same technique has been proposed for use in a radar altimeter; however, such a system suffers from weakness of the reflected signal at higher elevations. Continuous wave (CW) radio frequency altimeters are known, but heretofore have been limited because the transmitted signal is electromagnetically coupled by leakage signals into the receiving antenna and receiving antenna path.

There is need for an accurate continuous wave altimeter. Moreover, there is a need for a radar frequency altimeter, which has a low probability of being detector and/or jammed.

SUMMARY OF THE INVENTION

It is a principal object of the present invention to provide a novel radar altimeter.

It is another object of the present invention to provide a spread spectrum carrier wave radio frequency altimeter for covert applications.

It is yet another primary object of the present invention to provide a novel chip detecting and synchronizing loop for a tracking generator.

It is another object of the present invention to provide detecting means for recovering weak spread spectrum signals.

According to these and other objects of the present invention, a spread spectrum carrier wave signal is transmitted and the reflected signal received is filtered and phase shifted to prove two signals, which are detected in six detectors. The novel detecting means comprises two early detectors, two late detectors and in the preferred embodiment, two edge detectors. The power recovered in the six detectors is logically summed to provide a correlation signal indicative of whether the pseudonoise tracking generator is locked on to the received signal. The correlation signal is converted into an analog voltage, which is applied to a voltage controlled oscillator, which serves as the clock for driving the pseudonoise tracking generator to cause it to lock on to the received signal. Detecting means are provided in the transmitting apparatus to generate an epoch signal to start an altimeter counter and similar detecting means are employed to detect the occurrence of the same epoch signal in the receiving loop to stop the altimeter counter.

DESCRIPTION OF THE PREFERRED EMBODIMENT

Figure 1:
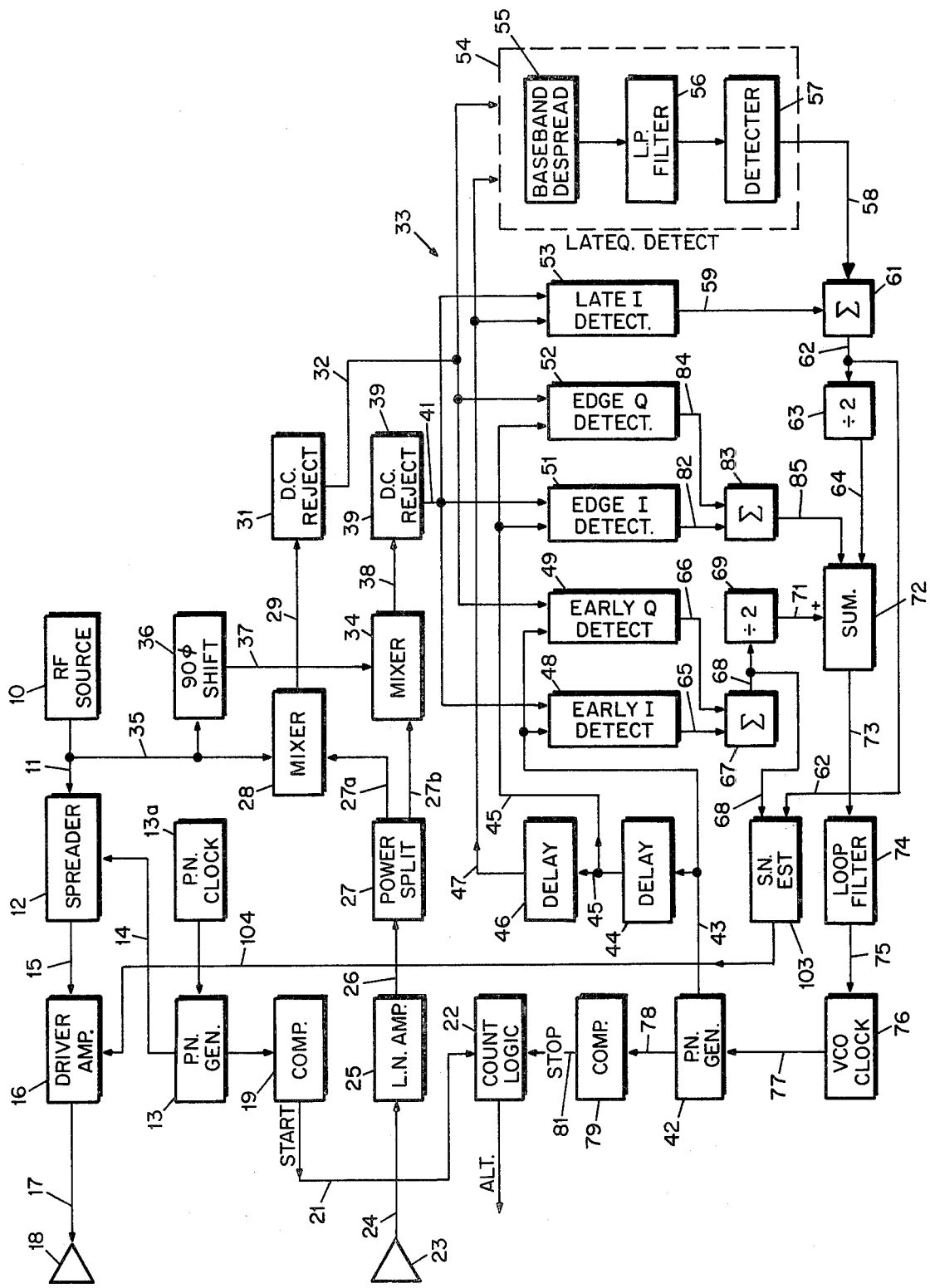
FIG. 1 is a block diagram of the preferred embodiment altimeter.

Refer now to FIG. 1 showing a block diagram of the preferred embodiment of the present invention. The radio frequency source 10 generates a carrier wave signal such as a sine or cosine wave signal on line 11 which is applied to spreader 12. Pseudonoise generator 13 generates a spread spectrum code on line 14, which is also applied to spreader 12, which multiplies the pseudonoise code on to the carrier source so as to generate a spread spectrum carrier wave signal on line 15, which is applied to driver amplifier 16. The output of driver 16 on line 17 is applied to transmitting antenna 18 for transmission of the spread spectrum signal. While the continuous signal is being transmitted from antenna 18, the pseudonoise generator 13 is generating a plurality of unique signals which are being sensed by comparator 19 and when a predetermined one of the unique signals is sensed, a start signal is generated on line 21, which is applied to an altimeter counter or counter logic 22 as a start signal for starting the altimeter count.

The continuous wave spread spectrum code which is transmitted from antenna 18 is reflected from some distant object such as the earth and is reflected back to receiving antenna 23. The received signal on line 24 is applied to a low noise amplifier or processor 25 which produces a signal gain without producing a high noise gain. The processed received signal on line 26 is applied to a power splitter 27 which produces two outputs without phase change. The first output on line 27a from power splitter 27 is applied to mixer 28 which also has an input from the radio frequency source 10 for producing a baseband signal output on line 29 which is applied to a D.C. reject filter or high pass filter 31. The output from the filter 31 on line 32 is applied to three of the individual detectors of the detector means 33 as will be explained in greater detail hereinafter. The second output from power splitter 27 on line 27b is applied to a second mixer 34 which has a second input from the radio frequency source 10 which is applied via line 35 to ninety degree phase shifter 36 to produce a phase shifted RF source on line 37 which is applied to mixer 34. The phase shifted baseband signal on line 38 from mixer 34 is applied to a D.C. reject filter 39 to produce a phase shifted baseband received signal on line 41 which is applied to three of the individual detectors of the detector means 33 as will be explained in detail hereinafter.

It will be understood that the baseband received signals on lines 32 and 41 are spread spectrum baseband signals which are delayed with respect to the signals transmitted from antenna 18 by the time required for the transmission of the signal to the earth plus the time for return to receiving antenna 23. The reason for splitting the return signal in power splitter 27 is to recover all of the energy available from the received signal. When the RF signal is exactly in phase with the return signal, all of the power will be obtained; however, if the received signal is ninety degrees out of phase with the RF source, then none of the power is obtained. By splitting the power at power splitter 27 and taking it through two mixers and shifting the RF source 10 ninety degrees, all of the power is available on the two lines 32 and 41.

Having explained that the signals on lines 32 and 41 are delayed with respect to the original transmitted signal from pseudonoise generator 13, it will be understood that the pseudonoise tracking code generator 42 must be maintained in phase with the received signals on lines 32 and 41. The output from generator 42 no line 43 is applied to a one chip delay 44 and the output from delay 44 on line 45 is applied to a second one chip delay 46 to produce the late chip output signal on line 47. The early chip time signal on line 43 is applied to the early in-phase detector 48 and the early quadrature detector 49. The edge chip time output signal on line 45 is applied to the edge in-phase detector 51 and the edge quadrature detector 52. The late chip time output on line 47 is applied to the late in-phase detector 53 and the late quadrature detector 54, which is shown inside the phantom lines. Each of the six power or voltage detectors 48, 49, 51, 52, 53 and 54 comprises a baseband despreader or correlator 55 which is coupled to a low pass filter 56 and its output signal is applied to a detector 57 such as a square law detector, for producing a voltage output on line 58 which is indicative of the power received by the detector or the degree of correlation received by the detector. When the output of late detector 53 on line 59 is summed or added to the output of late detector 54 on line 58 in summing network or summing circuit 61, the total available power from the later detector 53, 54 is produced on line 62. The output of late detector 53, 54 on line 62 is applied to a divide by two circuit or network 63 to produce half the available voltage on line 64.

In similar manner, the early detector 48, 49 is coupled to the processed received signals on lines 32 and 41 so as to produce detected output signals on lines 65 and 66 from the early in-phase detector 48 and the early quadrature detector 49 respectively. The detected signals on line 65 and 66 are applied to a summing network or circuit 67 to produce all of the correlation power or voltage available on line 68 which is applied to a divide by two circuit 69 to produce half of the available voltage on line 71. The correlation voltage signal from the early detector 48, 49 on line 71 is applied to summing logic circuit 72, which has a second input from the late detector 53, 54 on line 64. The logic summation of the power correlation signals available on line 71 and 64 can be logically interpreted to determine whether the pseudonoise generator 42 must be speeded up or slowed down in order for the output on line 73 to be approximately zero. When the output from summing logic circuit 72 is approximately zero, the pseudonoise generator 42 is locked on to the received signal being applied to the detector means 33. The output of summing logic 72 on line 73 is applied to a standard loop filter 74 to produce an amplified and process controlled voltage signal on line 74 which is applied to voltage controlled oscillator 76 which serves at the clock driver for pseudonoise generator 42. The clock signal on line 77 drives generator 42 and when the predetermined epoch signal appears at the output of generator 42 on line 78, it is detected by comparator 79 to produce a stop signal on line 81 which is applied to the altimeter logic counter 22. It will be understood that the original epoch signal from generator 13 which produced the start altimeter signal on line 21 is the same epoch signal being recognized and compared by comparator 79 to produce the stop signal on line 81; however, there is a time delay between the recognition of these epoch signals.

As explained hereinbefore, each of the six individual detectors comprises the elements 55, 56 and 57. It will also be understood and will be explained hereinafter, that the present invention is operable with the early detector 48, 49 and the late detector 53, 54. However, the preferred embodiment of the present invention requires the edge detector 51, 52 which is coupled to the received signals via lines 32 and 41 and is also coupled to the edge chip output time signal on line 45. The output from edge in-phase detector 51 on line 82 is applied to summing network or summing circuit 83 which has a second input on line 84 from edge quadrature detector 52. The total correlation power from the edge detector 51, 52 is presented on line 85 and is applied to the summing logic 72.

Figure 2:
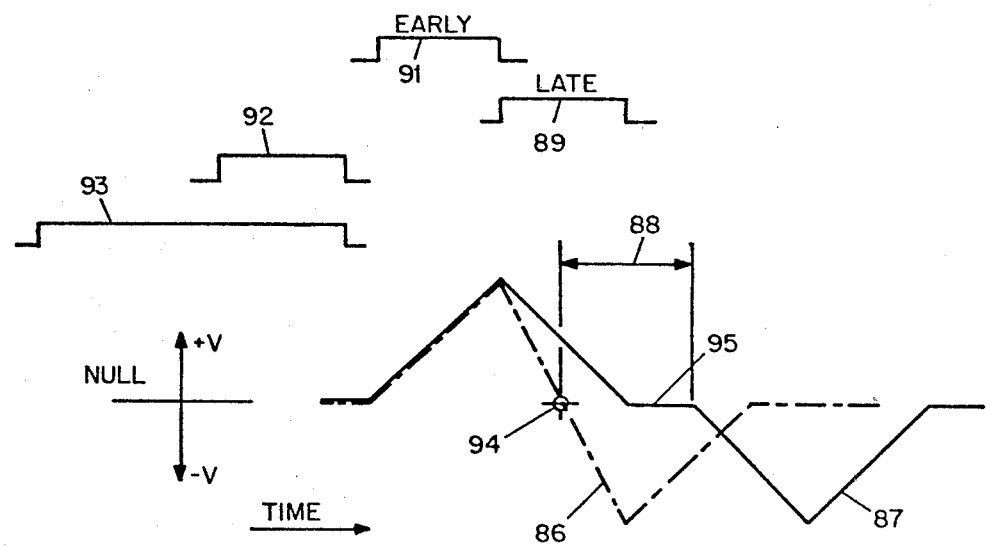
FIG. 2 is a schematic waveform diagram illustrating the recovered correlation signal when using an early detector and a late detector.

Refer now to FIG. 2 showing a schematic waveform diagram illustrating the operation of the present invention with two early detectors 48, 49 and two late detectors 53, 54. For the purposes of illustrations, waveform 86 may be described as a non-convoluted return signal of the type which would be vailable from a low altitude signal return and would be stable such that it would not be considered a vascillating or seeking signal. The waveform 87 is representative of a convoluted return signal of the type which would be obtained from a high altitude signal and would be unstable and seeking or vascillating. The difference between these return signals 86 and 87 at point 88 illustrates the amount of altitude error. Waveform 89 is representative of the late chip time appearing on line 47 and waveform 91 is representative of the early chip time appearing on line 43. When waveforms 89 and 91 are locked on to the received signal on lines 32 and 41, the generator 42 is tracking and locked on to the signal and there is no seeking or vascillation. However, during actual operation the early and late waveform 91 and 89 are not originally locked on. Waveform 92 is representative of the low altitude or non-convoluted return signal, which when moving and seeking will produce the non-convoluted correlation function shown by waveform 86. In similar manner, the convoluted return signal representative of the high altitude example is shown by waveform 93 and produces the convoluted correlation function as shown by waveform 87.

It will be understood by examination of waveforms 86 and 87 that when waveform 96 is locked on, the non-convoluted correlation factor reduces to the null point 94 and is stable or non-seeking. However, in the high altitude case there is no null point but there is a null line 95, which defines the seeking error range.

Figure 3:
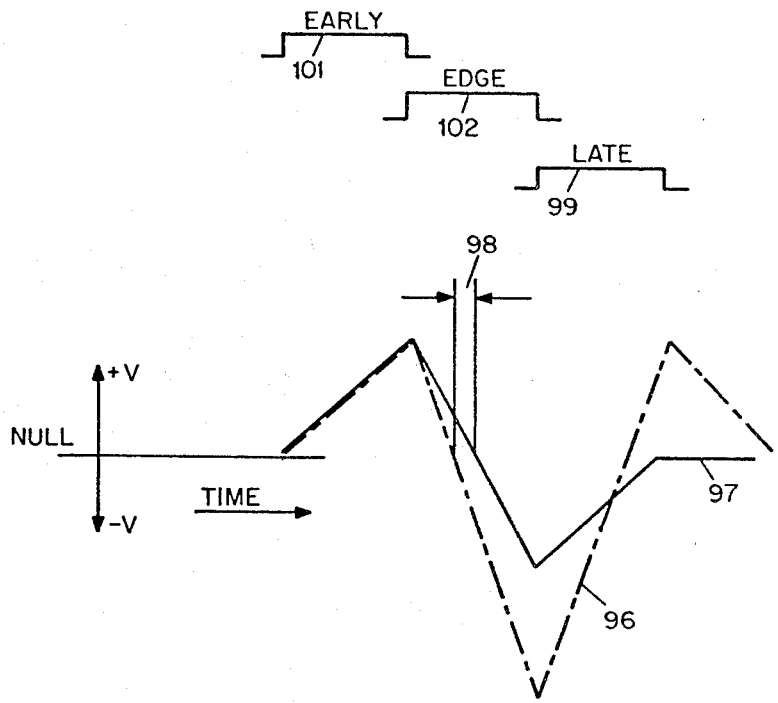
FIG. 3 is schematic waveform diagram illustrating the recovered correlation signal when using an early detector, an edge detector and a late detector.

Refer now to FIG. 3 which is similar to FIG. 2, but now includes the six detectors comprising early detector 48, 49, edge detector 51, 52 and late detector 53, 54. When the six individual detectors are used, the non-convoluted return signal correlation waveform 96 is generated. In similar manner, the convoluted return signal correlation waveform 97 is generated. It will be noted that the desparity or difference between the waveforms 96 and 97 at the neutral or null axis is insignificant and there is no seeking error defined by these waveforms. The small difference 98 at the neutral axis represents an ambiguity and not a seeking error. The late chip time output signal 99 is representative of the signal on line 47.

The edge chip time output waveform 102 is representative of the signal on line 45. The early chip time output waveform 101 is representative of the early chip time on line 43. When waveform 102 produces a null, the generator 42 is locked on to the signal being received on lines 32 and 41. The pseudonoise generator 42 locks on and there is no seeking or vascillation as described hereinbefore with two detectors. The edge waveform 102 is shown diametrically opposite the ambiguity 98 and as long as the edge waveform 102 holds its locked on position, the output from summing logic 72 is a predetermined reference signal or is null; thus, there is no correction signal applied to the voltage controlled oscillator clock 76 and the pseudonoise generator 42 maintains its locked on frequency.

In the locked on position, the edge detector 51, 52 is producing half the maximum power available from one chip time or one unique signal on line 85. All of the power available from one chip time is available on line 62 from late detector 53, 54 and now power, other than noise is available on line 68 or 71 from early detector 48, 49. Thus, when half of full power is on line 85, is subtracted from half of full power on line 64 the output from logic 72 is a null representative of a locked on condition.

It will be understood that summing logic 72 and loop filter 74 are provided with means for adjusting the output on line 75 so that the VCO clock may be biased in the early or low elevation direction. This condition is preferred because the generator 42 can then be made to sweep or seek from low elevation to high elevation and will lock on when the late and edge detectors 51–54 begin to produce outputs indicative of partial correlation.

In the locked on condition, there is no correlation power being produced at line 68 but some noise is present. In the locked on condition, maximum correlation power is being produced on line 62. The signal on line 62 is subtracted from the signal on line 68 in signal-to-noise estimator 103. The output on line 104 is applied as a level control signal to driver amplifier 16 to maintain a desired signal strength output at antenna 18.

Having explained a preferred embodiment of the present invention employing six individual detectors 48–54, including two edge detectors 51, 52, it will be understood that three pairs of in-phase and quadrature detectors are employed to recover all the power available. Other forms of processing circuits may be employed with the early, edge and late detectors described herein.

The three summing networks 67, 61 and 72 may be employed to produce a logic correction signal on line 73. Knowing that full power is produced by the late detector 53, 54 and substantially no power is produced by early detector 48, 49 other forms of logic controls may be employed. The simple dividing networks shown are intended to be operable examples and more sophisticate logic circuits may be employed which would produce equivalent results.

We claim:

1. A waveform encoded altitude sensing apparatus, comprising:
a radio frequency source,
a random code generator coupled to said radio frequency source for producing a plurality of unique coded signals and unique radio frequency random code modulated signals,
first epoch detector means coupled to the output of said random code generator for detecting a unique epoch chip representative of one of said unique signals and for generating a start epoch signal,
altitude counting means started by said start epoch signal,
transmitting means for transmitting said unique modulated signals,
receiving means for receiving returned delayed and attenuated reflected signals,
mixer means coupled to said receiver means and said radio frequency source for producing baseband received signals and phase shifted baseband received signals,
power detector means comprising an early power detector and a late power detector, said early and said late power detectors being coupled to the baseband signals from said mixer means for recovering the baseband returned signals,
tracking code generator means adapted to track said returned baseband signals,
delayed means in the output of said tracking code generator for producing an output indicative of an early chip time and a late chip time,
said early and said late chip time outputs being coupled to said early and said late power detectors respectively for detecting the power outputs representative of early and late power correlation respectively,
summing circuit means coupled to said power detecting means for determining when the maximum predetermined power correlation exists between the output of said early power detector and said late power detector,
voltage controlled oscillator means coupled to said summing circuit means for speeding up or slowing down said tracking code generator means, and
second epoch detecting means coupled to said tracking code generator means for detecting said unique epoch chip and for generating a stop epoch signal adapted to stop said altitude counting means, whereby said altitude count is indicative of a sensed altitude.

2. Apparatus as set forth in claim 1 wherein said mixer means includes a ninety degree phase shifter for shifting one of said demodulated received signals.

3. Apparatus as set forth in claim 2 wherein said early power detector comprises a baseband despreader for comparing said returned signals received by said receiver means with the early chip time output from said delay means.

4. Apparatus as set forth in claim 3 wherein said late power detector comprises a baseband despreader for comparing said returned signals received by said receiver means with the late chip time output from said delay means.

5. Apparatus as set forth in claim 4 wherein said early and said late power detectors each comprise a pair of baseband despreaders, one connected to said demodulated received signal and the other connected to said phase shifted demodulated received signal for recovering all of the power of said received signals from said mixer means.

6. Apparatus as set forth in claim 5 wherein said power detectors further comprise a square law voltage detector.

7. Apparatus as set forth in claim 6 wherein said voltage controlled oscillator means comprises a loop filter coupled to a voltage controlled oscillator.

8. Apparatus as set forth in claim 1 wherein said early and said late power detectors each include a pair of power detectors and wherein said summing circuit means comprises a first summing network at the outputs of said pair of early power detectors and a second summing network at the outputs of said pair of late power detectors and a third summing network connected to the outputs of said first and said second summing networks.

9. Apparatus as set forth in claim 8 which further includes level control means coupled to said transmitting means and to said first and said second summing networks for regulating the transmitter output power.

10. A waveform encoding altitude sensing apparatus, comprising:
- a radio frequency source,
- a random code generator coupled to said radio frequency source for producing a plurality of unique coded signals and unique radio frequency random code modulated signals,
- first epoch detecting means coupled to the output of said random code generator for detecting a unique epoch chip representative of one of said unique signals and for generating a start epoch signal,
- altitude counting means started by said start epoch signal,
- transmitting means for transmitting said unique modulated signals,
- receiving means for receiving returned delayed and attenuated reflected signals,
- mixer means coupled to said receiver means and said radio frequency source for producing demodulated received signals and phase shifted demodulated received signals,
- power detector means comprising an early, an edge and a later power detector,
- each said detector being coupled to said demodulated signals from said mixer means for recovering the demodulated returned signals,
- tracking code generator means adapted to track said returned demodulated signals,
- delay means in the output of said tracking code generator for producing an output indicative of an early chip time, an edge chip time and a late chip time,
- said early, edge and late chip time outputs being coupled to said early, edge and late power detectors respectively for detecting the power outputs representative of early, edge and late power correlation respectively,
- summing circuit means coupled to said power detecting means for determining when the maximum predetermined power correlation exists between said edge chip time output from said delay means and said demodulated signals from said mixer means,
- voltage controlled oscillator means coupled to said summing circuit means for speeding up or slowing down said tracking code generator means, and
- second epoch detector means coupled to said tracking code generator means for detecting said unique epoch chip and for generating a stop epoch signal adapted to stop said altitude counting means, whereby said altitude count is indicative of a sensed altitude.

11. Apparatus as set forth in claim 10 wherein said receiving means includes an amplifier and a power splitter for producing two received signals.

12. Apparatus as set forth in claim 11 wherein said mixer means comprises two mixers, each having an input from said power splitter, one of said mixers being coupled to said radio frequency source and the other mixer being coupled through a ninety degree phase shifter to said radio frequency source for producing a demodulated received signal and a ninety degree phase shifted demodulated received signal adapted to be coupled to each of said power detectors.

13. Apparatus as set forth in claim 10 wherein said summing circuit means comprises a first summing network coupled to said early power detector, a second summing network coupled to said late power detector, a fourth summing network coupled to said edge power detector and a third summing network coupled to the outputs of said first, said second and said fourth summing networks for producing a signal output indicative of the early or late correlation of said tracking code generator means output relative to said received returned demodulated signals,
the output of said third summing network of said summing means being coupled to said voltage controlled oscillator means for speeding up or slowing down said tracking code generator means.

14. The method of measuring altitude employing a spread spectrum carrier wave generated signal, comprising the steps of:
- generating a random code modulated signal by modulating a random code signal with a carrier wave signal,
- detecting a unique chip in said random code and startng an altitude counter,
- transmitting said random code modulated signals, receiving a delayed reflected version of said transmitted signal,
- demodulating said delayed reflected received signals, applying said demodulated reflected signals to a plurality of power detectors,
- generating a random code tracking signal,
- delaying said random code tracking signals with a tapped delay to produce an early chip time output, an edge chip time output and a late chip time output,
- applying said early, edge and late chip time outputs to one of said plurality of said power detectors,
- logically summing the power sensed by said power detectors to determine if said random code tracking signal is early or late relative to said received demodulated signal,
- generating a correction signal for speeding up or slowing down said random code tracking signals,
- detecting said unique chip in said random code of said random code tracking signals, and
- stopping said altitude counter when said unique chip in said random code tracking signals is detected, whereby said altitude count is indicative of a sensed altitude.

* * * * *